(12) United States Patent
Martikkala

(10) Patent No.: US 6,756,941 B2
(45) Date of Patent: Jun. 29, 2004

(54) METHOD FOR CALCULATING ABSOLUTE TIME DIFFERENCE IN RADIO SYSTEM, AND RADIO SYSTEM

(75) Inventor: Risto Martikkala, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/601,766

(22) Filed: Jun. 24, 2003

(65) Prior Publication Data
US 2004/0051663 A1 Mar. 18, 2004

(30) Foreign Application Priority Data
Jun. 26, 2002 (FI) .................................................. 021252

(51) Int. Cl.[7] .................................................. G01S 1/24
(52) U.S. Cl. .................................................. 342/387
(58) Field of Search .................. 342/387, 450, 342/451, 463

(56) References Cited

U.S. PATENT DOCUMENTS

| 6,011,974 A | 1/2000 | Cedervall et al. |
| 2002/0086682 A1 | 7/2002 | Naghian |

FOREIGN PATENT DOCUMENTS

| EP | 0 825 735 A2 | 2/1998 |
| JP | 5-211469 | 8/1993 |
| WO | WO 91/16639 | 10/1991 |
| WO | WO 99/56413 | 11/1999 |

*Primary Examiner*—Dao Phan
(74) *Attorney, Agent, or Firm*—Squire, Sanders & Dempsey L.L.P.

(57) ABSTRACT

The invention relates to a method for calculating an absolute time difference in a radio system, and to a radio system. In the radio system, location measurement units are maintained, the location measurement units receiving signals from base transceiver stations; a reference time for the reference base transceiver station and the detected time differences of the base transceiver stations are specified; the reference time of the reference base transceiver station and the detected time differences of the other base transceiver stations are reported; a computational absolute time is calculated; a corrected absolute time for the reference base transceiver station is calculated by using the computational absolute time, the reported reference base transceiver station reference time and a correction coefficient. Finally, the corrected absolute time and the detected time differences are used for calculating the absolute time differences, and the computational absolute time differences are stored.

30 Claims, 4 Drawing Sheets

METHOD FOR CALCULATING ABSOLUTE TIME DIFFERENCE IN RADIO SYSTEM, AND RADIO SYSTEM

BACKGROUND OF THE INVENTION

1. Field of the Invention

The invention relates to a method for calculating an absolute time difference in a radio system, and to a radio system.

2. Description of the Related Art

In radio systems, what is known as absolute time (AT) is usable as a reference time for various purposes. One of the most current applications is the use of absolute time in positioning.

Positioning a subscriber terminal, i.e. determining its geographical location, has become an increasingly important function in cellular radio networks. For instance in the United States, the Federal Communication Commission (FCC) requires that all subscriber terminals making an emergency call be positioned with an accuracy of up to 50 meters. Positioning can be also utilized for commercial purposes, e.g. for determining different tariff areas, or for implementing a navigation service guiding a user or simply for positioning family and friends.

Various methods are used for implementing the location service (LCS). Roughly, the location of a subscriber terminal can be positioned based on the identity of the cell serving the subscriber terminal. This is not very accurate information, since the diameter of a cell may be tens of kilometers.

A more accurate result is obtained by using radio link timing information as additional information, for instance the timing advance (TA). In the GSM system (Global System for Mobile Communications), the TA specifies the location of a subscriber terminal with the accuracy of about 550 meters. The problem is that if the cell is implemented with an omnidirectional antenna, then only the location of the subscriber terminal in known relative to a base transceiver station on a circle drawn around it. For example, a base transceiver station sectored into three sections improves the situation to some degree, but also in this case the location of a subscriber terminal can be positioned only in a 120-degree sector in a 550-meter deep area at a given distance from the base transceiver station.

These inaccurate methods are sufficient for some applications, e.g. for determining tariff areas. Methods that are more accurate have also been developed. Uplink methods are based on several different base transceiver stations making measurements from a signal transmitted by a subscriber terminal, an example being the TOA method (Time of Arrival).

However, downlink methods are more common, mainly due to a better capacity. In these, a subscriber terminal makes measurements from signals transmitted by several different base transceiver stations. An example of such a method is the E-OTD method (Enhanced Observed Time Difference). Since, in practice, a radio network is never completely synchronic, the actual timing of signals transmitted by base transceiver stations has to be measured. This can be taken care of by using a location measurement unit (LMU), placed in a measuring point having a known location. The location measurement unit serves to determine the real timing difference between the transmissions of the base transceiver stations. The effect of the real timing differences is eliminated from the results measured by the subscriber terminal, after which the location of the subscriber terminal can be determined geometrically based on the coordinates of the base transceiver stations, e.g. at the incidence point of the hyperboles or circles descriptive of the propagation time delays. In WCDMA systems (Wideband Code Division Multiple Access), the corresponding method is called the IPDLTOA method (Idle Period Down Link Time Difference Of Arrival).

In positioning systems, in most cases, the time difference between the clocks of base transceiver stations is determined by using what is called their real time difference (RTD), which are determined based on signals received by a location measurement unit from the base transceiver stations. However, base transceiver station time difference determination based only on RTD specifications requires much calculation capacity. In fact, positioning methods, for instance the E-OTD method, can also be applied by using what is known as the absolute time (AT) and absolute time differences (ATD), by means of which the need for calculation capacity is reduced. The use of the absolute time can be implemented for instance by determining the absolute time of what is known as a reference base transceiver station (Reference AT) relative to the time determined by using the receiver of a satellite positioning system. Typically, this is implemented relative to what is known as GPS time, determined using a GPS satellite positioning receiver (Global Positioning System), allowing the GPS receiver to be located for instance in a location measurement unit.

However, up to now, the problem in using absolute time was more error factors in the use of absolute time compared with the use of only RTD. Error in RTD specifications is caused for instance by the digital signal processing process (channel model error, arrival time of DSP signal) (Digital Signal Processing, DSP), and multipath propagation. When AT specifications are used, the error caused by for instance the clock oscillator and the GPS has to be added hereto. In methods known up to now, the aim has been to reduce the timing error by improving the accuracy of the GPS measurement, which has turned out to be difficult. In addition, GPS measurement is, however, only one factor in the AT specification error.

SUMMARY OF THE INVENTION

The object of the invention is to provide an improved method for calculating the absolute time difference in a radio system, and an improved radio system.

The improved method comprises maintaining location measurement units having a known location in the radio system and location measurement areas specified thereby, the location measurement units receiving signals from base transceiver stations in their location measurement area, one base transceiver station in the location measurement area being a location measurement unit reference base transceiver station, and at least one measured base transceiver station in the location measurement area being common to a second location measurement area; specifying a reference time for the reference base transceiver station and the detected time differences of the base transceiver stations in the location measurement area relative to the reference base transceiver station; reporting the reference time of the reference base transceiver station of the location measurement area and the detected time differences of the other base transceiver stations in the location measurement area for updating a base transceiver station absolute time difference table maintained in the radio system; calculating a computational absolute time for the reference base transceiver station by using the absolute time difference in the absolute time difference table of at least one reported base transceiver station, the difference being affected by the report of another location measurement unit, and the detected time difference reported by the location measurement unit to this base transceiver station; calculating a corrected absolute time for the reference base transceiver station by using the computational absolute time specified for it, the reported reference base transceiver station reference time and a correction coefficient; and using the corrected absolute time of the reference base transceiver station and the detected time differences of the reported base transceiver stations for calculating the absolute time differences for the base transceiver stations, and storing the computational absolute time differences of the base transceiver stations in the absolute time difference table.

The improved radio system comprises at least one subscriber terminal to be located, and at least three base transceiver stations used in the locationing and having a known location, one of the base transceiver stations operating as the base transceiver station serving the subscriber terminal. The improved radio system also comprises: at least two location measurement units having a known location and location measurement areas specified by them, the location measurement units receiving signals from base transceiver stations in their location measurement area, one base transceiver station in the location measurement area being a reference base transceiver station of the location measurement unit, and at least one measured base transceiver station being common to a second location measurement area; means for calculating an absolute time difference in the radio system locationing method, a location service absolute time difference table for storing and maintaining absolute time difference values of base transceiver stations; means for specifying a reference base transceiver station reference time; means for specifying detected time differences of the base transceiver stations in the location measurement area relative to the reference base transceiver station; means for maintaining values of the absolute time difference table of the base transceiver stations of the radio system; means for reporting the reference time of the reference base transceiver station of the location measurement unit and the detected time differences of the other base transceiver stations in the location measurement area for updating the base transceiver station absolute time difference table maintained in the radio system; means for calculating a computational absolute time for the reference base transceiver station by using the absolute time difference in the absolute time difference table of at least one reported base transceiver station, the difference being affected by the report of another location measurement unit, and the detected time difference reported by the location measurement unit to this base transceiver station; means for calculating a corrected absolute time for the reference base transceiver station by using the computational absolute time specified for it, the reported reference base transceiver station reference time and a correction coefficient; and means for using the corrected absolute time of the reference base transceiver station and the detected time differences of the reported base transceiver stations for calculating the absolute time differences for the base transceiver stations, and means for storing the computational absolute time differences of the base transceiver stations in the absolute time difference table.

Other preferred embodiments of the invention are described in the dependent claims.

The invention is based on using absolute time and absolute time differences of base transceiver stations in the positioning. In the radio system, a base transceiver station absolute time difference table, i.e. an ATD table, is maintained and updated based on reports from the location measurement units. The effect of the timing of the base transceiver stations is compensated for by means of the absolute time differences, i.e. the ATD values, when calculating the location of a subscriber terminal based on the OTD results (Observed Time Difference) reported by it. The report of the location measurement unit includes a reference base transceiver station reference time (Reference AT) and detected time differences of the base transceiver stations, i.e. OTD:s. In the method of the invention, the error caused by the measurements is corrected by correcting the results of a new report to be placed in the ATD table by suitable weighting in the direction of the expected absolute time differences of the ATD table to minimize the relative error between the location measurement areas.

The method and radio system of the invention bring forth a plurality of advantages. The calculation method of the invention enables a reduction of the relative error caused in the value of the absolute time of a base transceiver station, since each measured value is corrected in accordance with the results of several location measurement units. Another advantage of the invention is that it enables the use of absolute time, which requires less calculation capacity.

A further advantage of the method is that its use enables a pre-correction, before or during the calculation of the absolute time difference, of the error caused by other delays, e.g. cable or reflection delays or delays caused by the height of the measurement antenna.

BRIEF DESCRIPTION OF THE DRAWINGS

In the following, preferred embodiments of the invention will be described in detail with reference to the accompanying drawings, in which.

DESCRIPTION OF THE PREFERRED EMBODIMENTS

Figure 1:
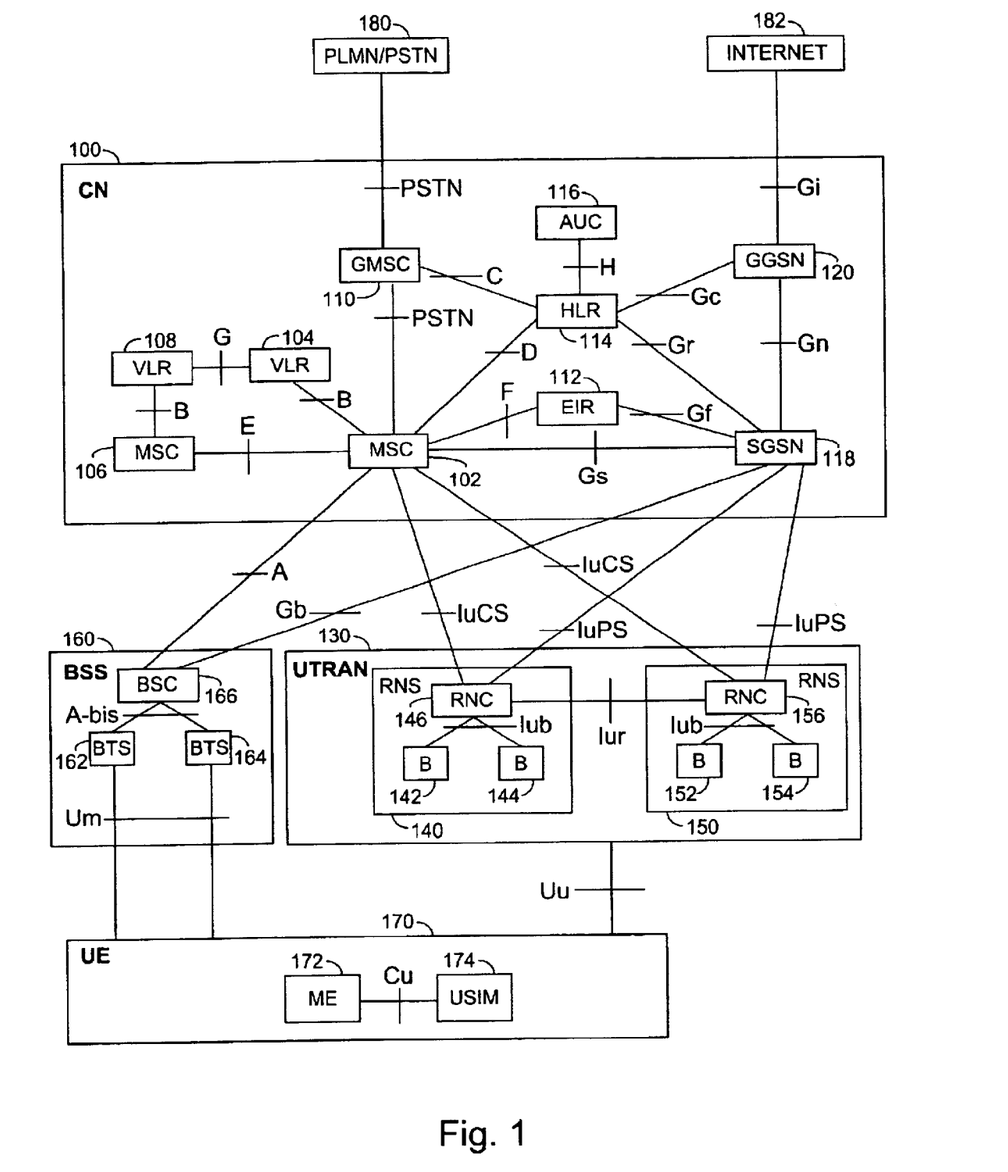
FIG. 1 is a simplified block diagram showing the structure of a radio system.

The method of calculating an absolute time difference is applicable in a radio system for executing positioning. The structure of a radio system will be described generally with reference to FIG. 1 as an example of a system to which the embodiments of the invention are applicable. FIG. 1 is a simplified block diagram showing the main parts of a radio system at network element level and the interfaces between them. The structure and functions of the network elements are not described in much detail, since they are generally known.

Since second-generation (2G) radio systems and third-generation (3G) radio systems, and various hybrids thereof, i.e. what are known as 2.5-generation (2.5G) radio systems are in global use and continuously being developed, the radio system illustrated in FIG. 1 comprises network elements of different generations in parallel. In the description, the representative of a second-generation radio system is the GSM (Global System for Mobile Communications), that of a so-called 2.5-generation radio system is a GSM/GPRS radio system applying the GPRS technology (General Packet Radio Service), and that of a third-generation radio system is a radio system known at least as IMT-2000 (International Mobile Telecommunications 2000) and UMTS (Universal Mobile Telecommunications System). The EDGE technology (Enhanced Data Rates for Global Evolution), used for increasing the data transfer rate, can also be considered to belong to the 3G technologies. It is usable for increasing transfer rates in 2G radio systems based on the GSM, and also for implementing packet transfer in the GPRS system (Enhanced General Packet Radio Service, EGPRS), which in its present form represents a 2.5G radio system. However, the embodiments are not limited to these exemplary systems, but a person skilled in the art is able to apply the solution of the invention also to other systems, wherein absolute time differences are calculated for implementing positioning.

The main parts of a radio system are a core network (CN) 100, a radio access network 130 and user equipment (UE) 170. In FIG. 1, the radio access network 130 is denoted by the term UTRAN, derived from the words UMTS Terrestrial Radio Access Network, i.e. the radio access network 130 belongs to the third generation and is implemented by the wideband code division multiple access technology (WCDMA). FIG. 1 also shows a base station system (BSS) 160, which belongs to the 2/2.5 generation and is implemented by the time division multiple access technology (TDMA). In 2/2.5-generation radio systems, the radio access network corresponding to the radio access network 130 of the 3G radio systems is based on the base station system 160. If the radio system is for instance a hybrid of the GSM-based GPRS or EGPRS and UMTS systems, wherein the structure of the radio access network is outlined UMTS-style, the radio network may be called for instance GERAN (GSM Enhanced Radio Access Network), wherein the radio interface is, however, a GSM-based normal radio interface or a radio interface using EDGE modulation.

Generally, a radio system may also be specified to be composed of a subscriber terminal and a network part comprising all fixed infrastructure of the radio system, i.e. a core network, a radio access network and a base station system. The subscriber terminal may also be called for instance user equipment or mobile phone.

The structure of the core network 100 corresponds to a combined structure of the GSM and GPRS systems. GSM network elements attend to the implementation of circuit-switched connections and GPRS network elements to the implementation of packet-switched connections. However, some network elements are included in both systems.

A mobile services switching center (MSC) 102 is the core of the circuit-switched side of the core network 100. The same mobile services switching center 102 can be used to serve the connections of both the radio access network 130 and the base station system 160. The tasks of the mobile services switching center 102 include: connection switching, paging, subscriber terminal location registration, handover management, collection of subscriber billing information, encryption parameter management, frequency allocation management and echo cancellation.

The number of mobile services switching centers 102 may vary; a small network operator may only have one mobile services switching center 102, whereas large core networks 100 may comprise several of them. FIG. 1 also shows a second mobile services switching center 106 and a visitor location register (VLR) related thereto, but the connections of the mobile services switching center 106 to the other network elements are not shown for the sake of clarity of the figure.

Large core networks 100 may have a separate gateway mobile service switching center (GMSC) 110, which attends to the circuit-switched connections between the core network 100 and external networks 180. The gate-way mobile service switching center 110 is located between the mobile services switching centers 102, 106 and the external networks 180. The external network 180 may be for instance a public land mobile network (PLMN) or a public switched telephone network (PSTN).

A home location register (HLR) 114 comprises a permanent subscriber register, i.e. for instance the following data: the international mobile subscriber identity (IMSI), the mobile subscriber ISDN number (MSISDN, Integrated Services Digital Network, ISDN), an authentication key, and a PDP address (PDP=Packet Data Protocol) when the radio system supports GPRS.

A visitor location register (VLR) 104 comprises information regarding roaming about subscriber terminals 170 roaming the area of the mobile services switching center 102. The visitor location register 104 comprises mainly the same information as the home location register 114, but said information is only temporarily in the visitor location register 104.

An equipment identity register (EIR) 112 comprises the international mobile equipment identities (IMEI) of the subscriber terminals 170 used in the radio system, and what is known as a white list including allowed equipment identities, and, possibly, a black and grey list including the equipment identities of forbidden and faulty equipment.

An authentication center (AuC) 116 is always physically located in the same place as the home location register 114, and comprises a subscriber authentication key Ki, and the corresponding IMSI.

The network elements shown in FIG. 1 are functional entities whose physical implementation may vary. Usually, the mobile services switching center 102 and the visitor location register 104 constitute one physical device, and the home location register 114, the equipment identity register 112 and the authentication center 116 a second physical device.

A serving GPRS support node (SGSN) 118 is the core of the packet-switched side of the core network 100. Its main task is to transmit and receive packets with a subscriber terminal 170 supporting packet-switched transfer by using the radio access network 130 or the base station system 160. The serving GPRS support node 118 comprises subscriber data and location data regarding the subscriber terminal 170.

A gateway GPRS support node (GGSN) 120 is the counterpart of the packet-switched side to the gateway mobile service switching center 110 of the circuit-switched side, however with the exception that the gateway GPRS sup-port node 120 also routes traffic outgoing from the core network 100 to external networks 182, whereas the gateway mobile service switching center 110 only routes incoming traffic. In our example, the Internet represents the external networks 182.

The base station system 160 is composed of a base station controller (BSC) 166 and base transceiver stations (BTS) 162,164.

The base station controller 166 controls the base transceiver station 162, 164. In principle, the aim is to place the devices implementing the radio path and related functions in the base transceiver station 162, 164, and the management devices in the base station controller 166.

The base station controller 166 attends to for instance the following tasks: management of base transceiver station 162,164 radio resources, inter-cell handovers, frequency management, i.e. allocation of frequencies to base transceiver stations 162, 164, management of frequency hopping sequences, measurement of uplink time delays, implementation of the operation and maintenance interface, and management of power control.

The base transceiver station 162, 164 comprises at least one transceiver for implementing one carrier, i.e. eight timeslots, i.e. eight physical channels. Typically, one base transceiver station 162, 164 serves one cell, but a solution is also feasible wherein one base transceiver station 162, 164 serves several sectors in a cell. In third-generation radio systems, the term cell is used to refer to a sector. The diameter of a cell may vary from some meters to tens of kilometers. The base transceiver station 162, 164 is also considered to comprise a transcoder (not shown in the figure) for implementing the conversion of the speech encoding form used in a radio system into the speech encoding form used in a general telephone network. However, in practice, the transcoder is usually physically located in the mobile services switching center 102. The tasks of the base transceiver station 162, 164 include for instance the following: calculation of TA (timing advance), uplink measurements, channel encoding, encryption, decryption, and frequency hopping.

The radio access network 130 is composed of radio network subsystems (RNS) 140, 150. Each radio network subsystem 140, 150 is composed of radio network controllers (RNC) 146, 156, and nodes B 142, 144, 152, 154. Node B is quite an abstract concept, and therefore the term base transceiver station is often used instead.

The functionality of the radio network controller 146, 156 almost corresponds to the base station controller 166 of the GSM system, and that of node B 142, 144, 152,154 to the base transceiver station 162,164 of the GSM system. Solutions are also available, wherein the same device serves as both a base transceiver station and node B, i.e. said device can be used to simultaneously implement both the TDMA and the WCDMA radio interface. In this context, the term base transceiver station will be used below to refer to both a base transceiver station 162, 164 of the GSM system and to a node B 142, 144,152,154 of the radio access network 130.

The subscriber terminal 170 is composed of two parts: mobile equipment (ME) 172 and a UMTS subscriber identity module (USIM) 174. The USIM 174 comprises information related to the user, and particularly information relating to information security, e.g. an encryption algorithm. The GSM system naturally uses a SIM of the GSM system. The subscriber terminal 170 comprises at least one transceiver (TRX) for establishing a radio link to the radio access network 130 or to the base station system 160. The subscriber terminal 170 may comprise at least two different subscriber identity modules. In addition, the subscriber terminal 170 comprises an antenna, a user interface and a battery. Nowadays, there are different types of subscriber terminals 170, for instance vehicle-mounted and portable. Properties better known from personal or portable computers have also been implemented in the subscriber terminal 170, an example being the Nokia® Communicator®.

The interfaces between the different network elements shown in FIG. 1 are described in Table 1. In the UMTS, the most important interfaces include the Iu interface between the core network and the radio access network, the interface being divided into a circuit-switched side interface IuCS (CS=Circuit Switched) and a packet-switched side interface IuPS (PS=Packet Switched), and the Uu interface between the radio access network and the subscriber terminal. In the GSM, the most important interfaces include the A interface between the base station controller and the mobile services switching center, the Gb interface between the base station controller and the serving GPRS support node, and the Um interface between the base transceiver station and the subscriber terminal. The interface specifies the types of messages the different network elements can use to communicate with each other. The object is a radio system wherein the network elements of different manufacturers are able to cooperate optimally so as to generate a functional radio system. However, in practice, some interfaces are manufacturer-dependent.

TABLE 1

| Interface | Between network elements |
|---|---|
| Uu | UE-UTRAN |
| Iu | UTRAN-CN |
| IuCS | UTRAN-MSC |
| IuPS | UTRAN-SGSN |
| Cu | ME-USIM |
| Iur | RNC-RNC |
| Iub | RNC-B |
| A | BSC-MSC |
| Gb | BSC-SGSN |
| A-bis | BSC-BTS |
| Um | BTS-UE |
| B | MSC-VLR |
| E | MSC-MSC |
| D | MSC-HLR |
| F | MSC-EIR |
| Gs | MSC-SGSN |
| PSTN | MSC-GMSC |
| PSTN | GMSC-PLMN/PSTN |
| G | VLR-VLR |
| C | HLR-GMSC |
| H | HLR-AUC |
| Gc | HLR-GGSN |
| Gr | HLR-SGSN |
| Gf | EIR-SGSN |
| Gn | SGSN-GGSN |
| Gi | GGSN-INTERNET |

Figure 2:
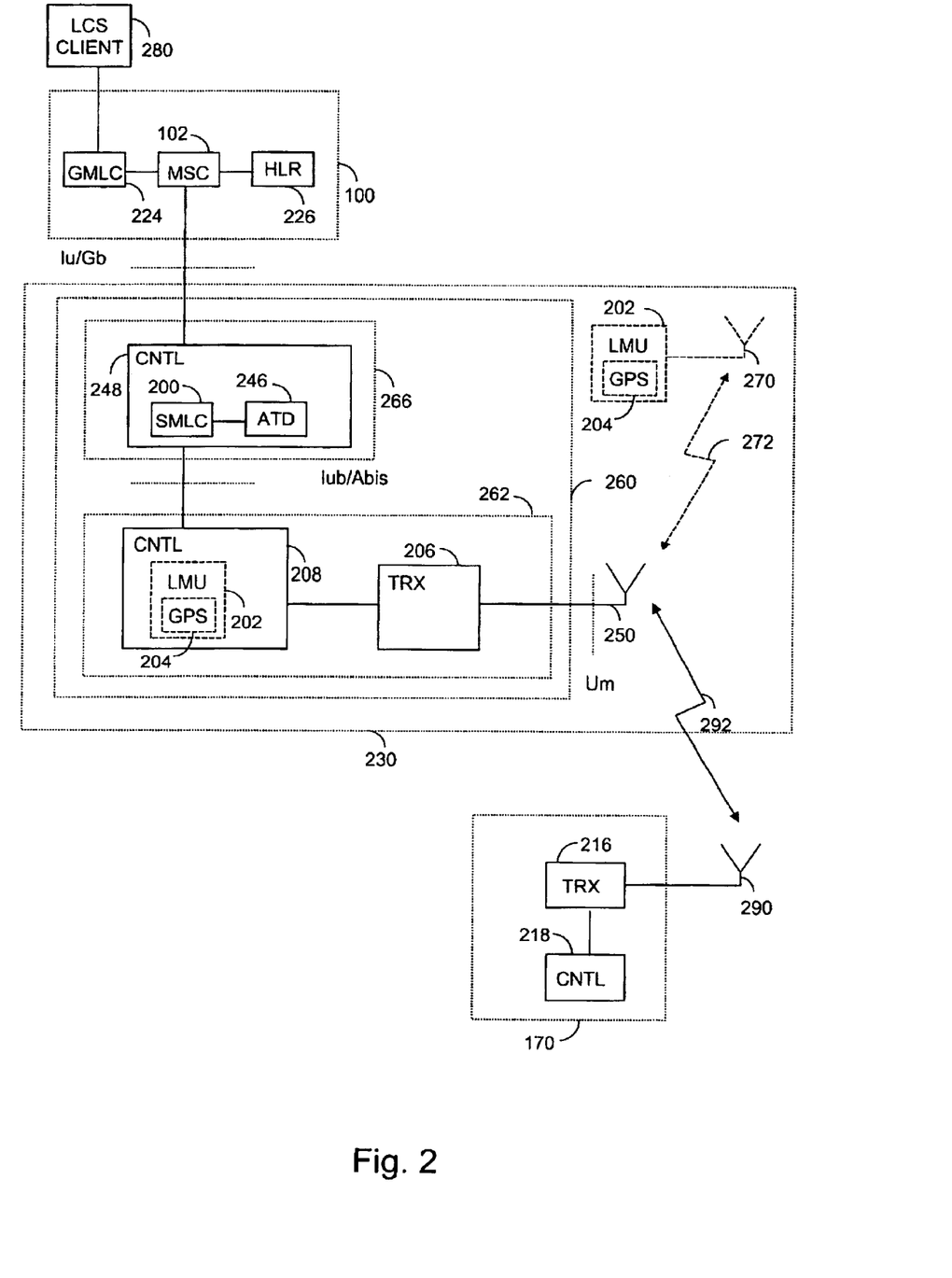
FIG. 2 is a simplified block diagram showing an example of the structure of a base station system and subscriber terminal of a radio system.

The radio system parts relevant to positioning and the present application, and the structures thereof, will be described in detail by means of FIG. 2. The radio system may be e.g. a 2.5-generation GSM/GPRS radio system, a radio system applying the second-generation GMS technology or a radio system according to UMTS system and applying the third-generation WCDMA technology, or a hybrid thereof. As far as the parts described are concerned, the radio access network 230 of FIG. 2 corresponds both to the 2/2.5-generation radio access network based on the base station system 160 and show in FIG. 1, and to the third-generation radio access network 130. Furthermore, the base station system 260 of FIG. 2 corresponds, as far as its described parts are concerned, to the structure of the radio network subsystem of FIG. 1 and the radio network subsystems 140, 150 comprised thereby and to the structure of the base station system 160. The base station system 260 of FIG. 2 may also be a hybrid of the above. FIG. 2 shows only one base transceiver station 262, which may thus refer to both a base transceiver station 162, 164 of the GSM system according to FIG. 1 or a node B 142, 144, 152, 154 of the radio access network 130 according to FIG. 1, but in the case of a normal radio system, there may naturally be several base transceiver stations 262. Similarly, only one base station controller 266 is shown, which thus corresponds to both the base station controller 166 and the radio network controller 146, 156 according to FIG. 1, although there may be several in a normal network. The different entities of the UMTS system and the corresponding entities of a GMS/GPRS/EGPRS network—CN 100, UT-RAN/GERAN 130, RNS/BSS 160, RNC/BSC 166, B/BTS 162—are outlined in FIG. 2 by boxes drawn with a broken line.

The base transceiver station 262 comprises a transceiver 206, an antenna 250, and a control unit 208. The base station controller 266 also comprises a control unit 248. The subscriber terminal 170 also comprises a normal transceiver 216 and an antenna 290 for implementing a radio link 292, and a control unit 218. In the case of a 2/2.5-generation radio system, the transceiver 216 employs the TDMA technology, and for instance normal GMSK modulation (Gaussian Minimum Shift Keying) or EDGE modulation, i.e. 8-PSK modulation (8Phase Shift Keying) of the GSM system. In the case of a radio system according to the WCDMA system, the transceiver 216 uses the WCDMA technology.

The devices used in location service include a serving mobile location center (SMLC) 200, which may be located in the manner described in the base station controller 266, e.g. in its control unit 248. It may also be located as a separate device connected to the base station controller 266.

The core network 100 comprises a gateway mobile location center (GMLC) 224, and a home location register (HLR) 226. The gateway mobile location center 224 serves to provide an external client 280 of the location service with the location service in question. The home location register 226 includes subscriber data and routing information of the location service.

A location measurement unit (LMU) 202 may be located either at the base transceiver station 262, e.g. in its control unit 208, or it may be implemented as a functionality of the control unit 208 or as a separate device connected to the base transceiver station 262. The location measurement unit 202 may also be located as a special unit separate from the base transceiver station 262, with which it communicates for instance over a radio path 272.

The subscriber terminal UE 170 comprises an antenna 290, via which the transceiver 216 comprised by the subscriber terminal 170 receives a signal from a radio path 292. The control unit 218 controls the operation of the subscriber terminal UE 170. In addition to the parts described, the subscriber terminal UE 170 also comprises a user interface, typically composed of a loudspeaker, a microphone, a display and a keyboard, and a battery, which will, however, not be described in detail herein.

The above-described control unit 208, 218, 248 refers to a block controlling the operation of the device, nowadays usually implemented as a processor and software, but various hardware implementations are also feasible, e.g. a circuit built from separate logics components or one or more application-specific integrated circuits (ASIC). A hybrid of these different implementations is also feasible. Accordingly, the functionality required can be implemented with the control unit 208, 218, 248. When selecting the implementation, a person skilled in the art will pay attention for instance to the requirements set on the size and power consumption of the device, the required processing power, manufacturing costs and production volumes.

The E-OTD positioning method (Enhanced Observed Time Difference) will be described in detail with reference to FIGS. 2 and 3. The E-OTD is an example of a positioning method, to which the absolute time difference calculation method is applicable, but its use is naturally not limited only to the E-OTD method, but it can also be applied to other positioning methods based on the use of absolute time, i.e. AT.

Positioning methods are often divided into network-based (Uplink methods) and subscriber terminal-based (Downlink methods) methods. In subscriber terminal-based methods, the subscriber terminal 170 is able to make measurements from signals transmitted by several different base transceiver stations 304, 306, 308, 318. In the E-OTD method, which can be considered a hybrid of network-based and subscriber terminal-based methods, the subscriber terminal 170 receives a signal from at least three different base transceiver stations 304, 306, 308, whose location is known and of which one acts as the base transceiver station 306 serving the subscriber terminal and at least two as its adjacent base transceiver stations 304, 306. The subscriber terminal 170 measures the observed time differences (OTD) between the serving base transceiver station 306 and the two adjacent base transceiver stations 304, 308, and reports 390 the differences to the serving mobile location center (SMLC) 200.

Since a radio network is never completely synchronic in practice, the timing differences of the base transceiver stations also have to be found out. This can be implemented by at least one location measurement unit 302 having a known location measuring the time differences (OTD) of the reference base transceiver station 304 of the location measurement unit 302 and its adjacent base transceiver stations 304, 308, observed in a known location, and reports 372 the differences to the serving mobile location center SMLC 200.

The serving mobile location center SMLC 200 calculates the real time differences (RTD) by subtracting the known propagation time delay, i.e. the geometric time difference (GTD) caused by the distance of the known locations of said base transceiver station and the location measurement unit 302 from each observed time difference OTD.

The location of the subscriber terminal 170 is then determined on the basis of geometric components (e.g. hyperboles) obtained from the propagation dime delays. On the other hand, the geometric time difference GTD is equal to the observed time difference OTD, from which the real time difference RTD is subtracted.

The serving mobile location center SMLC 200 acting as the calculation center is usually located at the base station controller 266, the RNC 146, 156 or the BSC 166, but it could alternatively be located in another radio network part. The GSM specifications specify two different solutions for the location service: a base station system-centered (BSS) and a network subsystem-centered (MSS). In the base station system-centered solution, the location center functionality SMLC 200 is connected to the base station controller 166, and in the network subsystem-centered solution, to the mobile services switching center 102. The only solution specified in the UMTS specifications is a radio network-centered solution, which is also specified in the GPRS specifications.

The E-OTD method can be further improved by using AT reporting. This can be implemented for instance by placing a satellite positioning receiver 204, for example a GPS receiver 204, in the location measurement unit, for example, and use the receiver for measuring the reference absolute time (Reference AT), i.e. the Reference AT value, i.e. the GPS time, of the signal of the reference base transceiver station, and report the time to the serving mobile location center SMLC 200. The location measurement unit 202 thus reports not only the measured OTD values of the base transceiver stations, but also the determined reference time RefAT, i.e. the absolute time of the reference base transceiver station, to the serving mobile location center 200. Reference AT values, i.e. reference times, can be further used for calculating the values of an ATD table, i.e. absolute time difference table 246, maintained at the serving mobile location center. The real time differences of the base transceiver stations can also be calculated at the serving mobile location center 200 on the basis of the geometric time differences GTD determined by means of the known locations of the base transceiver stations and the location measurement unit and the observed time differences OTD, i.e. RTDn=OTDn−GTDn.

A radio system to which the absolute time difference calculation method is applied in positioning is described next with reference to FIGS. 2 and 3. The radio system is shown by way of example by showing the devices that are essential to the absolute time difference calculation method. The method used in positioning can be for instance the E-OTD method, but it can equally well be another positioning method using absolute time.

The radio system comprises at least one subscriber terminal 170 to be located, and also at least three base transceiver stations 304, 306, 308, 314, 316, 318, having a known location and used in positioning, one of the base transceiver stations, e.g. base transceiver station 306, acting as the base transceiver station serving the subscriber terminal.

The radio system also comprises at least two location measurement units 302, 312 having a known location, and location measurement areas determined by them. The location measurement unit 302, 312 can be placed in connection with some base transceiver station 304, 306, 308, 314, 316, 318. In this case, the location measurement unit 202 may be located for instance in the control unit 208 of the base transceiver station, and it can also be implemented as a functionality of the control unit or as a separate device connected to either the control unit 208 or somewhere else in the base transceiver station 262, whereby it may be called LMU-b, for example. The location measurement unit 202 may also act as a separate unit, whereby it can be called LMU-a, for example, and which uses for instance its antenna structures 270 to communicate with the base transceiver station over the radio link 272. FIG. 3 shows this alternative and FIG. 2 by a dashed line. An independent location measurement unit 202 may also be in a cable connection to the base transceiver station 262, for instance using a link according to the E1 standard.

The herein described absolute time difference calculation method is applied in a situation wherein at least one of the base transceiver stations is common to another location measurement area. In the example of FIG. 3, the base transceiver station 318 is common to location measurement units 302 and 312, i.e. the subscriber terminal 170 is located in an area to which cells 394, 396, 398 implemented by base transceiver stations 304, 306, 308 of the location measurement unit 302, and cell 392 implemented by base transceiver station 318 belong, the latter cell belonging also to the location measurement area of the location measurement unit 312.

One of the location measurement area's base transceiver stations acts as a reference base transceiver station of the location measurement unit, and the receiver of the location measurement unit synchronizes to said base transceiver station. The reference base transceiver station may be located separate from the location measurement unit, as is the case in FIG. 3. If the location measurement unit 202 is located in connection with base transceiver station 262, as in FIG. 2, the reference base transceiver station is typically the base transceiver station 262 to which the location measurement unit 202 is connected. In the example of FIG. 3, wherein location measurement units 302, 312 are located separate from the base transceiver stations, let us select base transceiver station 304 as the reference base transceiver station of location measurement unit 302, and base transceiver station 314 as the reference base transceiver station of location measurement unit 312. The reference base transceiver station 304 and the location measurement unit 302 are synchronized by using a signal 374. Similarly, the reference base transceiver station 314 and the location measurement unit 312 are synchronized by using a signal 354. It is to be noted that another base transceiver station of each location measurement area could equally well act as the reference base transceiver station of the location measurement unit in question.

Each location measurement unit 302, 312 receives signals from base transceiver stations in its location measurement area, e.g. location measurement unit 302 receives signals 374, 376, 378, 368 from base transceiver stations 304, 306, 308, 318, and location measurement unit 312 signals 354, 356, 358 from base transceiver stations 314, 316, 318. In this way, as the signals transmitted by base transceiver stations 304, 306, 308, 318 are received not only at the subscriber terminal 170, but also at the location measurement unit 302, 312, the time delays of base transceiver stations 304, 306, 308, 318 can be determined by means of the location measurement unit 302, 312.

The radio system comprises a positioning system absolute time difference table 246, whose values are maintained by using the control unit 248. The values of the absolute time difference table 246 are updated by storing base transceiver station absolute time differences in the table by using the control unit 248, the differences being calculated by using the control unit 248 comprised by the radio system.

The radio system comprises a location measurement unit 202, which is used to determine the reference time of the reference base transceiver station 262 and the observed time differences of the base transceiver stations of the location measurement area relative to the reference base transceiver station.

The radio system may also comprise tables of real time differences, i.e. RTD tables (not shown in the figures), which are typically maintained in a serving mobile location center SMLC 200, wherein the real time differences of the base transceiver stations are determined on the basis of the geometric time differences and the observed time differences of the base transceiver stations.

The reference time of the reference base transceiver station 262 of the location measurement unit 202 and the observed time differences of the other base transceiver stations of the location measurement area are reported to the control unit 248 for updating the absolute time difference table 246 and the real time difference tables by using a location measurement unit 202 comprised by the radio system. Thus, in the case of FIG. 3, the location measurement unit 302 reports 372 the reference time of its reference base transceiver station 304 and the observed time differences of the base transceiver stations 306, 308, 318 to the serving mobile location center SMLC 200. Similarly, the location measurement unit 312 reports 352 the reference time of its reference base transceiver station 314 and the observed time differences of the base transceiver stations 316, 318 to the serving mobile location center SMLC 200.

The absolute time difference table 246, i.e. the ATD table 246, can be maintained centrally in the serving mobile location center 200 of the radio system, in connection with which the control unit 248 is located in this case. A centralized solution enables less communication and increased capacity. However, the calculation and maintenance of the absolute time difference table 246 could also take place in another manner, for instance by the location measurement units 302, 312 maintaining the absolute time difference tables of their areas. In this case, when the location measurement unit is located in connection with a base transceiver station, the maintenance of the absolute time difference table would also take place in connection with the base transceiver station. The serving mobile location center 200 is usually located at the base station controller 266, the RNC 146, 156 or the BSC 166, but it could alternatively also be located at some other radio network part.

The control unit 248 comprised by the radio system is used to calculate the computational absolute time of the reference base transceiver station 304 of the location measurement unit 302 by using an absolute time difference in the absolute time difference table of at least one reported base transceiver station 304, the difference being affected by the report of another location measurement unit 312; and the detected time difference reported by the location measurement unit 302 to this base transceiver station.

Next, the control unit 248 is used to calculate the corrected absolute time of the reference base transceiver station 304 by using a computational absolute time determined for it, the reported reference time of the reference base transceiver station 304 and a correction coefficient.

The control unit 248 is then used to calculate the absolute time differences of the base transceiver stations 306, 308, 318 by using the corrected absolute time of the reference base transceiver station 304 and the observed time differences of the reported base transceiver stations 306, 308, 318. Finally, the computational absolute time differences of the base transceiver stations are stored in the absolute time difference table 246 by using the control unit 248.

The radio system may also comprise a control unit 248, which can be used to select and adjust the correction coefficient to be used in the calculation.

In an embodiment, the error caused by the height of the measurement antenna used by the location measurement unit or the known reflection delays can be pre-corrected to the absolute time differences of a base transceiver station stored in the absolute time difference table. Similarly, the error caused by the cable delays of the antennas used by the location measurement unit can be corrected. Cable delays may be caused both by the antenna of the receiver of the location measurement unit, i.e. the RX antenna, and by the antenna of the GPS receiver. This can be carried out either by using the control unit 248 comprised by the radio system in connection with the calculation of the absolute time differences or by using the location measurement unit 202 comprised by the radio system in connection with the measurements.

Figure 3:
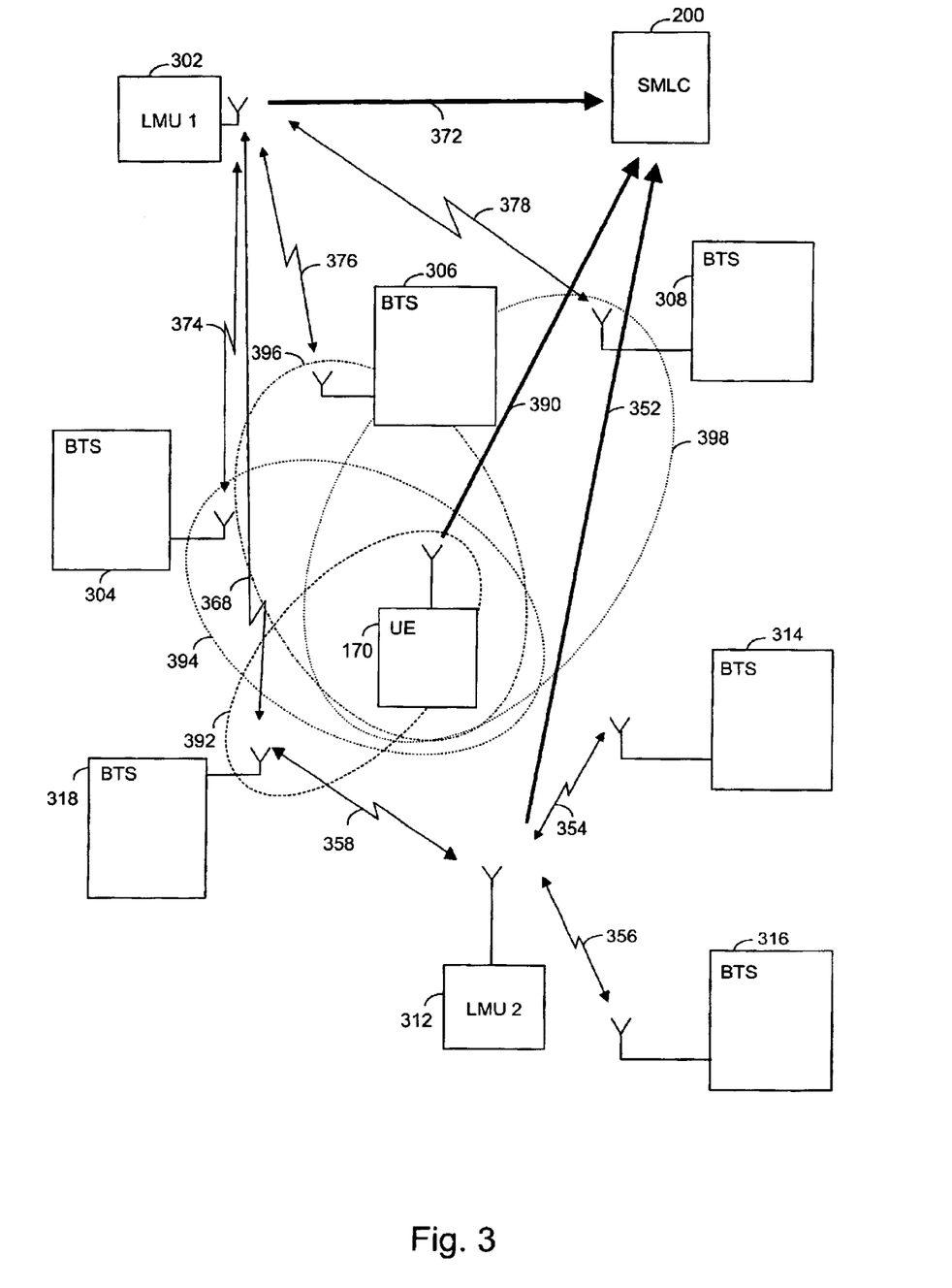
FIG. 3 is a simplified block diagram showing an example of a positioning system.

The above described control units 208, 218, 248, shown in FIGS. 2 and 3, comprised by the radio system and deviating from prior art, referring to a block controlling the operation of the device, and the location measurement units 202, 302, 312, and the other blocks and units described, can be implemented for instance by software, whereby the absolute time difference calculation method mainly requires software changes in the radio network, where the calculation and maintenance of the absolute time difference table takes place, i.e. usually in the location measurement unit 200. These, as well as other necessary means in the core network 100, the radio network 130, the base station system 160 and the subscriber terminal 170 can, however, also be implemented as a suitable combination of SW and HW implementations, usually as a combination of software executed in a processor and an electronics implementation. The absolute time difference table 246 described is typically located in the memory of the processor. The technology typically used in an electronics implementation is the ASIC technology (Application Specific Integrated Circuit), but other implementations are also feasible, for instance a circuit built from separate logics components or a processor and software. A hybrid of these different implementations is also feasible. When selecting the implementation, a person skilled in the art will pay attention for instance to the requirements set on the size and power consumption of the device, the required processing power, manufacturing costs and production volumes. It is to be noted that FIGS. 2 and 3 mainly describe functional entities, whereby, in practice, the parts of the hardware implementation may deviate from what was shown, since the actual point is how to implement the means implementing the desired functionality most efficiently and inexpensively in said application.

Figure 4:
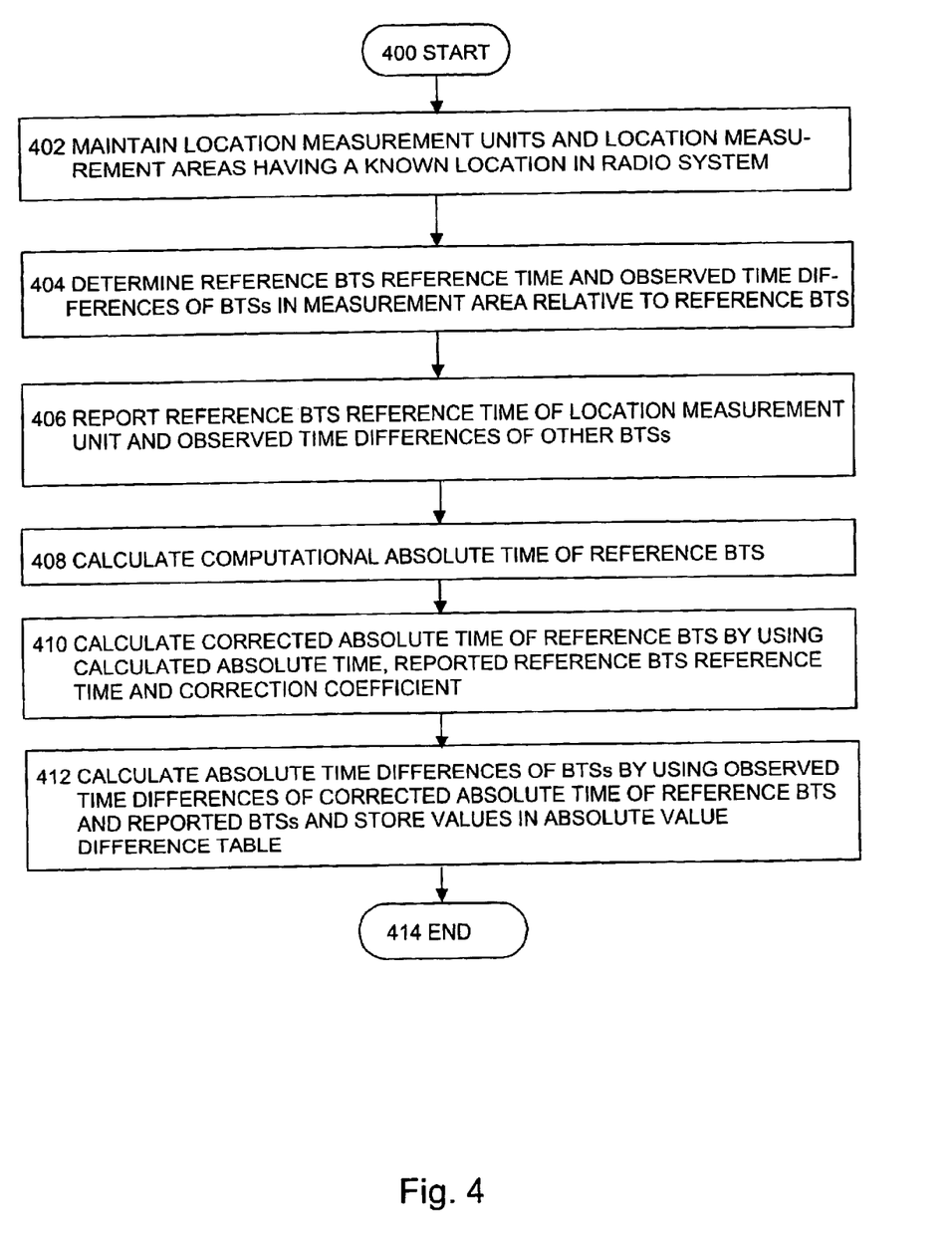
FIG. 4 is a flow diagram illustrating a method of calculating an absolute time difference.

Finally, a method of calculating an absolute time difference in a radio system will be described by way of example with reference to the block diagram of FIG. 4.

The method begins at 400. Then, in 402, location measurement units having a known location and location measurement areas specified thereby are maintained. These location measurement units receive signals from the base transceiver stations of their location measurement area, one of which is the reference base transceiver station of the location measurement unit specifying the location measurement area, and at least one base transceiver station is common to a second location measurement area.

In 404, the reference time of the reference base transceiver station and the observed time differences of the other base transceiver stations of the location measurement are determined relative to the reference base transceiver station.

In 406, the reference time of the reference base transceiver station of the location measurement unit and the observed time difference of the other base transceiver stations of the location measurement area relative to the reference base transceiver station are reported for updating the absolute time difference table of the base transceiver stations maintained in the radio system.

In 408, the computational absolute time of the reference base transceiver station is calculated by using the absolute time difference of at least one reported base transceiver station in the absolute time difference table, the difference being affected by the report of another location measurement unit, and the observed time difference reported by the location measurement unit to this base transceiver station.

In 410, the corrected absolute time of the reference base transceiver station is calculated by using a computational absolute time specified for it, the reported reference time of the reference base transceiver station and a correction coefficient.

In 412, the corrected absolute time of the reference base transceiver station and the observed time differences of the reported base transceiver stations are used to calculate the absolute time differences of the base transceiver stations, the absolute time differences then being stored in the absolute time difference table. The execution of the method ends at 414.

In the time difference calculation, the geometric time difference (GTD) is typically taken into account, referring to the propagation path delay caused by the distance between the location measurement unit and the neighboring base transceiver stations. In other words, the delay caused by the base transceiver stations of the measurement area and the known distances (Line of Sight, LOS) of the location measurement unit are taken into account, and they are used in the calculation of the computational absolute time of the reference base transceiver station.

In the embodiment described, the computational absolute time (AT_calc) is thus calculated by using at least one absolute time difference (ATD1, ..., ATDn; n is the number of base transceiver stations used in the calculation) of a reported base transceiver station found in the absolute time difference table, the observed time difference (OTD1, ..., OTDn) reported to the base transceiver station, and the geometric time difference (GTD1, ..., GTDn) of the base transceiver station. The geometric time difference (GTDref) of the reference base transceiver station is small if the location measurement unit is installed in connection with the reference base transceiver station, but it can be presented for the sake of clarity. The calculation is carried out by subtracting the observed time difference OTD reported to said base transceiver station from each such absolute time difference and by adding the geometric time difference GTD of the base transceiver station thereto, and by calculating the average of these expressions. Thus, the calculation formula of the computational absolute time (AT_calc) can be written in the following form:

$$AT\_calc=((ATD1-OTD1+GTD1)+(ATD2-OTD2+GTD2)+\ldots+(ATDn-OTDn+GTDn))/n$$

In the embodiment described, the corrected absolute time (AT_corr) is calculated by using a computational absolute time determined for it, the reported reference time (AT_ref) of the reference base transceiver station and a correction coefficient (c) by multiplying the difference of the computational absolute time (AT_calc) and the reference time (AT_ref) of the reference base transceiver station by the correction coefficient (c) and by adding the reference time (AT_ref) of the reference base transceiver station to it. Thus, the calculation is based on the following formula:

$$AT\_corr=AT\_ref+(AT\_calc-AT\_ref)\cdot c/100\%$$

Furthermore, the absolute time differences (ATD) of the base transceiver stations to be stored in the absolute time difference table are calculated by taking into account the geometric time difference (GTD) by adding the observed time difference (OTD) of the base transceiver station to the corrected absolute time (AT_corr) and by subtracting the geometric time difference, whereby the calculation formula can be written in the form:

$$ATDn=AT\_corr+OTDn-GTDn$$

The absolute time difference ATDref—of the reference base transceiver station to be stored in the absolute time difference table is calculated ATDn=AT_corr−GTDn.

The reference time (AT_ref) of the reference base transceiver station can be determined by the location measurement unit for instance by using a GPS receiver placed therein.

The real time differences (RTD) of the base transceiver stations relative to the reference base transceiver station can also be determined on the basis of the observed time differences (OTD) measured by the location measurement unit in a known place by the serving mobile location center SMLC by deleting the effect of the known propagation time delays (GTD). Thus, the real time difference RTD is calculated as the difference between the observed time difference OTD and the geometric time difference GTD, i.e. by the following formula:

$$RTD=OTD-GTD$$

thus enabling the calculation of the real time differences RTD of each base transceiver station and the maintenance of the RTD table in the serving mobile location center SMLC. The RTD values calculated on the basis of the OTD and GTD values can also be used in the ATD calculation instead of the difference between the OTD and the GTD.

In an embodiment, the correction coefficient used in the method is selected such that the relative error of the absolute time differences calculated on the basis of the reports of the different location measurement areas would be as small as possible. On the other hand, the correction coefficient should also be selected such that each new report of a location measurement area has a sufficient effect, so that the absolute time difference table follows the timing changes sufficiently accurately.

In the above described embodiment, the computational absolute time of the reference base transceiver station is determined by using at least one base transceiver station common to the different location measurement areas, but more than one base transceiver station common to the different location measurement areas can thus also be used in the calculation. In the execution of the method, base transceiver stations belonging to the networks of different operators may also be used as neighboring base transceiver stations and as base transceiver stations common to the different location measurement areas. However, their coordinates do have to be known.

The correction coefficient used in the calculation can also be adjusted. In addition, the correction coefficient can be determined such that it is used to react to other determinable additional parameters known in the standards than only the RTD when calculating the OTD or RTD values. These include for example quality, change and the sharpness of the change. The method can be controlled for instance by using the SMLC to search the reports of the location measurement units for quality, OTD values or the RTD values calculated based thereon and the quality of these values, for example. The correction coefficient can be adjusted for instance by taking into account the fact if the measurements show a small deviation. Or the correction coefficient can for instance be adjusted such that it takes into account if a new report of a location measurement unit has good quality values, allowing the values of the report of the new location measurement unit to be weighted more, for example.

The method is also applicable such that the correction coefficient operates based on a given limit value, i.e. if the difference between a measured value obtained from the report and the values of the absolute time difference table exceeds a given limit, a given coefficient is used or the reported value is not used at all, for example.

The error caused by the height of the measurement antenna or the known reflection delays can also be pre-corrected to the absolute time differences of a base transceiver station stored in the absolute time difference table. Similarly, the error caused by the cable delays of the antennas used by the location measurement unit can be corrected. Cable delays may be caused both by the antenna of the receiver of the location measurement unit, i.e. the RX antenna, and by the antenna of the GPS receiver. Cable delays affect both the OTD results and the AT results and the RTD results calculated based on the OTD results; the errors caused by the reflections and the antenna height mainly affect the OTD results and the RTD results. The errors can be corrected either in connection with the absolute time difference calculation or in connection with the measurements.

The method can also be applied by using only the reports of one location measurement unit. In this case, the computational absolute time of the reference base transceiver station and, further, the absolute time differences of the base transceiver stations are calculated by using the absolute time difference of at least one reported base transceiver station in the absolute time difference table, i.e. the previous reports of the same location measurement unit are used. In this case, the serving mobile location center SMLC could be helped to filter the deviation of the reference time (AT_ref) of the reference base transceiver station, the deviation showing as an error in the same direction in the result of the neighboring base transceiver stations of all location measurement areas, i.e. OTD neighbors that are simultaneously also RTD neighbors.

A radio system of the type described previously is suitable for implementing the method and its different embodiment, but other types of systems are also suitable for implementing the method.

Although the invention is described above with reference to the example according to the accompanying figures, it is apparent that the invention is not limited thereto, but can be modified in a variety of ways within the scope of the inventive idea disclosed in the attached claims.

What is claimed is:

1. A method for calculating an absolute time difference in a radio system, comprising:

maintaining location measurement units having a known location in the radio system and location measurement areas specified thereby, the location measurement units receiving signals from base transceiver stations in their location measurement area, one base transceiver station in the location measurement area being a location measurement unit reference base transceiver station, and at least one measured base transceiver station in the location measurement area being common to a second location measurement area;

specifying a reference time for the reference base transceiver station and the detected time differences of the base transceiver stations in the location measurement area relative to the reference base transceiver station;

reporting the reference time of the reference base transceiver station of the location measurement area and the detected time differences of the other base transceiver stations in the location measurement area for updating a base transceiver station absolute time difference table maintained in the radio system;

calculating a computational absolute time for the reference base transceiver station by using the absolute time difference in the absolute time difference table of at least one reported base transceiver station, the difference being affected by the report of another location measurement unit, and the detected time difference reported by the location measurement unit to this base transceiver station;

calculating a corrected absolute time for the reference base transceiver station by using the computational absolute time specified for it, the re-ported reference base transceiver station reference time and a correction coefficient; and using the corrected absolute time of the reference base transceiver station and the detected time differences of the reported base transceiver stations for calculating the absolute time differences for the base transceiver stations, and storing the computational absolute time differences of the base transceiver stations in the absolute time difference table.

2. The method of claim 1, wherein information of known geometric time differences of the base transceiver stations is maintained in the serving mobile location center.

3. The method of claim 1, wherein the computational absolute time of the reference base transceiver station is calculated by subtracting the observed time difference reported to the base transceiver station from each absolute time difference of a reported base transceiver station found in the absolute time difference table and by adding the geometric time difference of the base transceiver station thereto, and by calculating the average of these clauses.

4. The method of claim 1, wherein the absolute time differences of the base transceiver stations to be stored in the absolute time difference table are calculated by adding the observed time difference of the base transceiver station to the corrected absolute time and by subtracting the geometric time difference of the base transceiver station from it.

5. The method of claim 1, wherein a table of real time differences calculated on the basis of the observed time differences and the geometric time differences used in the calculation of the base transceiver stations are maintained in the serving mobile location center.

6. The method of claim 1, wherein the real time differences calculated on the basis of the observed time differences and the geometric time differences are used in the calculation of the computational absolute time of the reference base transceiver station and the absolute time differences of the base transceiver stations.

7. The method of claim 1, wherein the correction coefficient is selected such that the relative error between the absolute time differences calculated on the basis of the reports of the different location measurement areas is as small as possible.

8. The method of claim 1, wherein the correction coefficient is selected such that the absolute time difference table follows the changes in the timing in accordance with every the report of every new location measurement area.

9. The method of claim 1, wherein the computational absolute time of the reference base transceiver station is calculated by using at least one base transceiver station common to the different location measurement areas.

10. The method of claim 1, wherein base transceiver stations belonging to networks of different operators and having known coordinates are usable in the calculation.

11. The method of claim 1, wherein the error caused by the height of the measurement antenna used by the location measurement unit is pre-corrected to the absolute time difference of a base transceiver station stored in the absolute time difference table.

12. The method of claim 1, wherein the error caused by the cable error of the antenna used by the location measurement unit is pre-corrected to the absolute time difference of a base transceiver station stored in the absolute time difference table.

13. The method of claim 1, wherein the error caused by known reflection delays is pre-corrected to the absolute time difference of a base transceiver station stored in the absolute time difference table.

14. The method of claim 1, wherein the errors caused by the height of the measurement antenna or by the cable error of the antenna or by known reflection delays are corrected in connection with the absolute time difference calculation.

15. The method of claim 1, wherein the errors caused by the height of the measurement antenna or by the cable error of the antenna or by known reflection delays are corrected in connection with the measurements.

16. A radio system comprising:

at least one subscriber terminal to be located, and at least three base transceiver stations used in the locationing and having a known location, one of the base transceiver stations operating as the base transceiver station serving the subscriber terminal;

wherein the radio system also comprises:

at least two location measurement units having a known location and location measurement areas specified by them, the location measurement units receiving signals from base transceiver stations in their location measurement area, one base transceiver station in the location measurement area being a reference base transceiver station of the location measurement unit, and at least one measured base transceiver station being common to a second location measurement area;

means for calculating an absolute time difference in the radio system locationing method, a location service absolute time difference table for storing and maintaining absolute time difference values of base transceiver stations;

means for specifying a reference base transceiver station reference time;

means for specifying detected time differences of the base transceiver stations in the location measurement area relative to the reference base transceiver station;

means for maintaining values of the absolute time difference table of the base transceiver stations of the radio system;

means for reporting the reference time of the reference base transceiver station of the location measurement unit and the detected time differences of the other base transceiver stations in the location measurement area for updating the base transceiver station absolute time difference table maintained in the radio system;

means for calculating a computational absolute time for the reference base transceiver station by using the absolute time difference in the absolute time difference table of at least one reported base transceiver station, the difference being affected by the report of another location measurement unit, and the detected time difference reported by the location measurement unit to this base transceiver station;

means for calculating a corrected absolute time for the reference base transceiver station by using the computational absolute time specified for it, the reported reference base transceiver station reference time and a correction coefficient; and means for using the corrected absolute time of the reference base transceiver station and the detected time differences of the reported base transceiver stations for calculating the absolute time differences for the base transceiver stations, and means for storing the computational absolute time differences of the base transceiver stations in the absolute time difference table.

17. The radio system of claim 16, wherein the serving mobile location center comprises means for maintaining data about the known geometric time differences of the base transceiver stations.

18. The radio system of claim 16, wherein the radio system comprises means for calculating the computational absolute time of the reference base transceiver station by subtracting the observed time difference reported to the base transceiver station from each absolute time difference of a reported base transceiver station found in the absolute time difference table and by adding the geometric time difference of the base transceiver station thereto, and by calculating the average of these clauses.

19. The radio system of claim 16, wherein the radio system comprises means for calculating the absolute time differences of the base transceiver stations to be stored in the absolute time difference table by adding the observed time difference of the base transceiver station to the corrected absolute time and by subtracting the geometric time difference of the base transceiver station from it.

20. The radio system of claim 16, wherein serving mobile location center comprises means for maintaining a table of real time differences calculated on the basis of the observed time differences and the geometric time differences.

21. The radio system of claim 16, wherein the radio system comprises means for using the real time differences calculated on the basis of the observed time differences and the geometric time differences in the calculation of the computational absolute time of the reference base transceiver station and the absolute time differences of the base transceiver stations.

22. The radio system of claim 16, wherein the radio system comprises means for selecting the correction coefficient such that the relative error between the absolute time differences calculated on the basis of the reports of the different location measurement areas is as small as possible.

23. The radio system of claim 16, wherein the radio system comprises means for selecting the correction coefficient such that the absolute time difference table follows the changes in the timing in accordance with every the report of every new location measurement area.

24. The radio system of claim 16, wherein the average absolute time of the reference base transceiver station is calculated by using at least one base transceiver station common to the different location measurement areas.

25. The radio system of claim 16, wherein base transceiver stations belonging to networks of different operators and having known coordinates are usable in the calculation.

26. The radio system of claim 16, wherein the radio system comprises means for pre-correcting the error caused by the height of the measurement antenna used by the location measurement unit in the absolute time difference of a base transceiver station stored in the absolute time difference table.

27. The radio system of claim 16, wherein the radio system comprises means for pre-correcting the error caused by the cable error of the antenna used by the location measurement unit in the absolute time difference of a base transceiver station stored in the absolute time difference table.

28. The radio system of claim 16, wherein the radio system comprises means for pre-correcting the error caused by known reflection delays in the absolute time difference of a base transceiver station stored in the absolute time difference table.

29. The radio system of claim 16, wherein the radio system comprises means for correcting, in connection with the absolute time difference calculation, the errors caused by the height of the measurement antenna or by the cable error of the antenna or by known reflection delays.

30. The radio system of claim 16, wherein the radio system comprises means for correcting, in connection with the measurements, the errors caused by the height of the measurement antenna or by the cable error of the antenna or by known reflection delays.

* * * * *

UNITED STATES PATENT AND TRADEMARK OFFICE
CERTIFICATE OF CORRECTION

PATENT NO.     : 6,756,941 B2
DATED          : June 29, 2004
INVENTOR(S)    : Risto Martikkala It is certified that error appears in the above-identified patent and that said Letters Patent is hereby corrected as shown below:

<u>Title page</u>,
Item [30], Foreign Application Priority Data, should read:
-- [30]            Foreign Application Priority Data
        June 26, 2002        (FI)            20021252 --

Signed and Sealed this

Thirtieth Day of November, 2004

JON W. DUDAS
*Director of the United States Patent and Trademark Office*